US009229795B2

United States Patent
Maes et al.

(10) Patent No.: US 9,229,795 B2
(45) Date of Patent: Jan. 5, 2016

(54) EXECUTION OF END-TO-END PROCESSES ACROSS APPLICATIONS

(71) Applicant: HEWLETT-PACKARD DEVELOPMENT COMPANY, L.P., Houston, TX (US)

(72) Inventors: Stephane Herman Maes, Fremont, CA (US); Lars Rossen, Palo Alto, CA (US); Woong Joseph Kim, Milford, CT (US); Keith Kuchler, Ft. Collins, CO (US); Jan Vana, Trebon (CZ); Petr Fiedler, Uvaly (CZ); Ankit Ashok Desai, Santa Clara, CA (US); Christopher William Johnson, Evergreen, CO (US); Michael Yang, Leonia, NJ (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 14/563,327

(22) Filed: Dec. 8, 2014

(65) Prior Publication Data
US 2015/0160989 A1 Jun. 11, 2015

Related U.S. Application Data

(60) Provisional application No. 61/913,799, filed on Dec. 9, 2013.

(51) Int. Cl.
*G06F 13/00* (2006.01)
*G06F 9/54* (2006.01)
*G06Q 30/02* (2012.01)
*H04L 12/58* (2006.01)

(52) U.S. Cl.
CPC ............... *G06F 9/546* (2013.01); *G06F 9/542* (2013.01); *G06Q 30/0276* (2013.01); *H04L 51/046* (2013.01)

(58) Field of Classification Search
CPC .................................. G06F 9/546; G06F 9/542
USPC .................................................. 719/313, 318
See application file for complete search history.

(56) References Cited

U.S. PATENT DOCUMENTS

| | | | |
|---|---|---|---|
| 2005/0010458 A1* | 1/2005 | Holloway et al. | 705/7 |
| 2006/0178893 A1* | 8/2006 | McCallie et al. | 705/1 |
| 2007/0074225 A1* | 3/2007 | Viertola et al. | 719/313 |
| 2011/0125823 A1* | 5/2011 | Macken | 709/201 |
| 2011/0314165 A1* | 12/2011 | Maes et al. | 709/227 |
| 2013/0254376 A1* | 9/2013 | Kudikala et al. | 709/224 |

OTHER PUBLICATIONS freemarker.org—Freemarker—Overview, Oct. 2014 (2 pages).
Hewlett-Packard Development Company, L.P., International Appl. No. PCT/US2013/067870 entitled Aggregating, Presenting, and Fulfilling a Number of Catalogs filed Oct. 31, 2013 (31 pages).
Hewlett-Packard, Universal Data Model (UDM) Overview dated on or before Nov. 2014 (1 page).

(Continued)

*Primary Examiner* — Andy Ho
(74) *Attorney, Agent, or Firm* — Trop, Pruner & Hu, P.C.

(57) ABSTRACT

An orchestrator executes an end-to-end process across applications. An message broker exchanges information among the orchestrator and the processes of the applications. Adapters perform protocol and interface translations for information communicated between the message broker and the respective applications.

24 Claims, 4 Drawing Sheets

(56) References Cited

OTHER PUBLICATIONS

Maes et al., U.S. Appl. No. 14/563,331 entitled Execution of a Workflow That Involves Applications or Services of Data Centers, filed Dec. 8, 2014 (43 pages).

Maes et al., U.S. Appl. No. 14/563,552 entitled Fulfiling a Request Based on Catalog Aggregation and Orchestrated Execution of an End-To-End Process, filed Dec. 8, 2014 (41 pages).

Martin Fowler, Microservices, Mar. 25, 2014 (16 pages).

opengroup.org—IT4IT FAQ—The Open Group Blog, Feb. 2-5, 2015 (3 pages).

Srikanth et al., IBM, DeveloperWorks, Schools Interoperability Framework and SOA—An interoperability bridge, Mar. 15, 2011 (14 pages).

Wikipedia, RabbitMQ dated on or before Nov. 2014 (4 pages).

www.mulesoft.com—Understanding Enterprise Application Integration—The Benefits of ESB for EAI dated on or before Nov. 2014 (6 pages).

* cited by examiner

EXECUTION OF END-TO-END PROCESSES ACROSS APPLICATIONS

CROSS-REFERENCE TO RELATED APPLICATION

This application claims the benefit under 35 U.S.C. §119(e) of U.S. Provisional Application No. 61/913,799, filed Dec. 9, 2013, which is hereby incorporated by reference.

BACKGROUND

An enterprise may employ multiple applications to perform various tasks. The tasks can be performed by various applications, and in some cases multiple applications can perform overlapping tasks. As an example, the tasks can include tasks associated with information technology (IT) management, such as management of development and production of program code, management of a portfolio of products or services, support management, IT service management, cloud and Software as a Service (SaaS) service management and so forth. IT management performs management with respect to components of an IT environment, where the components can include computers, storage devices, communication nodes, machine-readable instructions, and so forth. Various aspects of IT management can be modeled by an Information Technology Infrastructure (ITIL) (that provides a set of best practices for IT management), a Business Process Framework (eTOM) from the TM Forum, and so forth. With advancements in IT management technology, new IT management processes have been introduced, such as self-service IT, IT as a service provider, DevOps and autonomous IT, and so forth.

BRIEF DESCRIPTION OF THE DRAWINGS

Some implementations are described with respect to the following figures.

DETAILED DESCRIPTION

Figure 1:
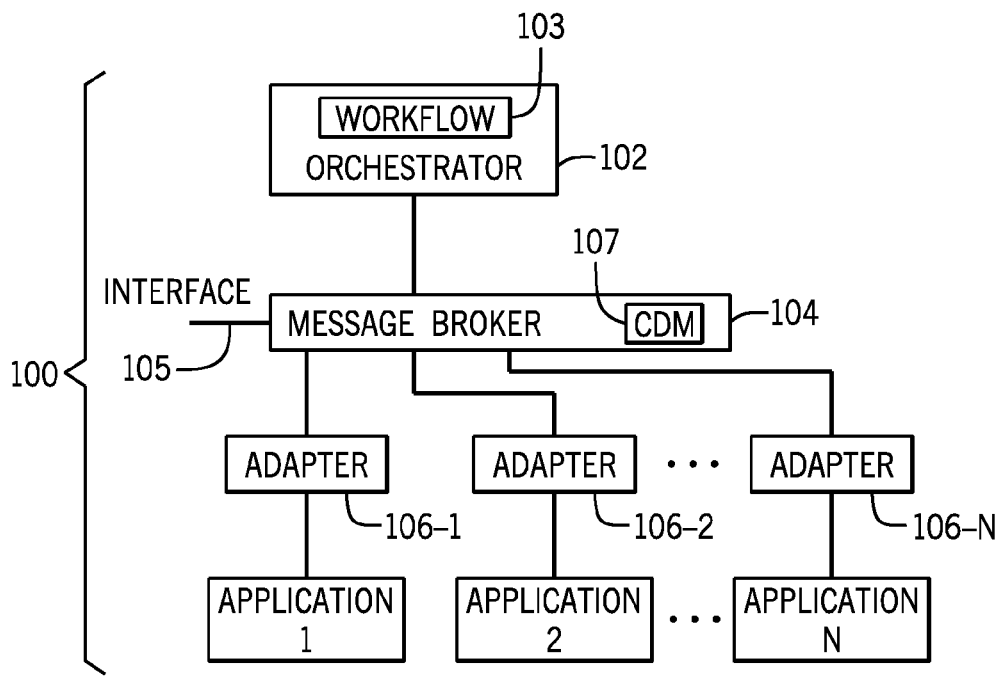
FIG. 1 is a block diagram of an example service exchange according to some implementations.

Workflows performed by an enterprise can involve the use of a number of applications. An "enterprise" can refer to a business concern, an educational organization, a government agency, an individual, or any other entity. A "workflow" can refer to any process that the enterprise can perform, such as a use case. Such a process of the workflow can also be referred to as an "end-to-end process" or an "enterprise process" since the process involves a number of activities of the enterprise from start to finish. A "use case" can refer to any specific business process or other service that an enterprise desires to implement. An "application" can refer to machine-readable instructions (such as software and/or firmware) that are executable. The application can include logic associated with an enterprise process, which can implement or support all or parts of the enterprise process (or processes). An application can be an application developed by the enterprise, or an application provided by an external vendor of the enterprise. An application can be provided on the premises of the enterprise, or in the cloud (public cloud or virtual private cloud), and the application can be a hosted application (e.g. an application provided by a provider over a network), a managed service (a service managed and/or operated by a third party that can be hosted or on premise), or a software as a service (SaaS) (a service available on a subscription basis to users), and so forth. In some cases, multiple applications used by the enterprise may be provided by different vendors.

Within a portfolio of applications used by an enterprise, many applications may not be able to directly interact with each other. In general, an application implements a particular set of business logic and is not aware of other applications that are responsible for performing other processes. The design of the application may or may not have taken into account the presence of other applications upstream or downstream (with respect to an end-to-end process). This is especially true for older (legacy) applications. More recently, applications can at least expose well defined application programming interfaces (APIs) that assume that the applications will be interacting with other systems. Such applications are called by their APIs or can call other APIs. Even with such APIs, applications may not readily interact with each other. Different applications may employ different data formats, different languages, different interfaces, different protocols, and so forth.

Application developers have developed a portfolio of applications that rely on using point-to-point integration to provide some level of integration across the portfolio. With point-to-point integration, a given application is aware of another application in the portfolio that is upstream or downstream of the given application. Such applications are mutually aware of each other.

A point-to-point integration mechanism can include a component (or multiple components) provided between applications to perform data transformations, messaging services, and other tasks to allow the applications to determine how and when to communicate and interact with each other.

Different point-to-point integration mechanisms can be provided for different subsets of applications. If there are a large number of applications in a portfolio of applications used by an enterprise, then there can be a correspondingly large number of point-to-point integration mechanisms.

As applications evolve (e.g. new release of an application, new functionality added to an application, variation of the expected use cases, variation of interaction to take place between applications), corresponding point-to-point integration mechanisms may have to be modified and/or re-tested. Modifying or re-testing an integration mechanism between applications can be a time-consuming and costly exercise, particularly if there are a large number of integration mechanisms deployed by the enterprise. This exercise can rapidly become a complex combinatorial exercise. If point-to-point integration is used, an enterprise may be hesitant to upgrade applications, to add new applications, to change application vendors, or to modify processes, since doing so can be complex and costly. However, maintaining a static portfolio of applications can prevent an enterprise from being agile in meeting evolving demands by users or customers of the enterprise. If an enterprise has applications provided by multiple vendors, additional challenges may arise. The application can be built to support updated releases of other applications, which adds complexity to application development if an enterprise wishes to deploy another release of an application of another vendor.

In accordance with some implementations of the present disclosure, a service exchange and integration framework (referred to as a "service exchange" in the ensuing discussion) is provided that is able to integrate applications in a flexible manner, and orchestrate execution of workflows (which can refer to enterprise processes or use cases as noted above). Applications are used to implement their respective logic parts of each workflow. These applications are orchestrated to automate the end-to-end enterprise process or use case.

According to the present disclosure, orchestrating execution of a workflow can refer to modeling and executing the logic of sequencing of the tasks of the workflow. Some of the tasks of the workflow are delegated using the orchestration to be performed by the logic of the applications. As an example, a workflow can include an order fulfillment workflow. An order fulfillment workflow can include the following tasks: receive an order from a customer, determine applications that are to be involved in fulfilling the order, invoke the identified applications to fulfill the order, and return a status (e.g. confirmation number or information to further manage the order, such as to view, update, cancel, or repeat the order) to the customer. Note that the foregoing example order fulfillment workflow is a simplified workflow that includes a simple collection of tasks. An actual order fulfillment workflow may involve many more tasks.

FIG. 1 illustrates an example service exchange 100, which includes an orchestrator 102, a message broker 104, and adapters 106-1 to 106-N (collectively referred to as "adapters 106"). FIG. 1 shows N adapters (N≥2). The adapters 106 are provided between the message broker 104 and the respective applications (application 1, application 2, . . . , application N depicted in FIG. 1). The orchestrator 102, message broker 102, and adapters 106-1 to 106-N are part of the service exchange platform. Content can be loaded onto the platform, where the content includes flow logic to implement workflows (e.g. 103) that correspond to enterprise processes or use cases, and the applications. As discussed further below, such content can be changed and different content packs can coexist to support multiple use cases.

Each of the orchestrator 102, message broker 104, and adapters 106 can be implemented as a combination of machine-executable instructions and processing hardware, such as a processor, a processor core, an application-specific integrated circuit (ASIC) device, a programmable gate array, and so forth. In other examples, any of the orchestrator 102, message broker 104, and adapters 106 can be implemented with just processing hardware.

Note that FIG. 1 is a view of the overall architecture, and each of the components shown in FIG. 1 can be a separate system. Alternatively, some or all of the components shown in FIG. 1 can be integrated into a system. The platform can also support a pattern that includes executing a workflow by the orchestrator 102, making calls from the workflow 102 to delegate tasks to applications, receiving events (e.g. responses to calls, results produced by applications, or other events) or calls from the applications or from other sources, and reacting, by the orchestrator 102 to the events or calls by performing actions.

The orchestrator 102 is used to orchestrate the execution of a specific workflow 103 that involves tasks performed by multiple applications (e.g. a subset or all of application 1, application 2, . . . , application N). To perform a workflow, flow logic can be loaded into the orchestrator 102, and the flow logic is executed by the orchestrator 102. "Flow logic" can include a representation of a collection of tasks that are to be performed. The flow logic can be in the form of program code (e.g. a script or other form of machine-executable instructions), a document according to a specified language or structure (e.g. Business Process Execution Language (BPEL), a Business Process Model and Notation (BPMN), etc.), or any other type of representation (e.g. Operations Orchestration from Hewlett-Packard, YAML Ain't Markup Language (YAML), Mistral from OpenStack, etc.). The flow logic can be generated by a human, a machine, or program code, and can be stored in a machine-readable or computer-readable storage medium accessible by the orchestrator 102.

The orchestrator 102 is able to execute multiple flow logic to perform respective workflows. Multiple workflows and workflow instances (instances of a particular workflow refer to multiple instantiations of the particular workflow) can be concurrently executed in parallel by the orchestrator 102.

The orchestrator 102 is able to evaluate (interpret or execute) a flow logic, and perform tasks specified by the flow logic in response to a current state of the workflow and calls and events received by the orchestrator 102. A workflow can be a stateful workflow. As a stateful workflow is performed by the orchestrator 102, the orchestrator 102 is able to store a current state of the workflow, to indicate the portion of the workflow already executed. Based on the workflow's current state and a received event, the orchestrator 102 is able to transition from a current state to a next state of the workflow and can determine a next action to perform, where the next action may involve the invocation of another application. Whenever the orchestrator 102 receives a new call or event (e.g. response, results, or other event), the orchestrator 102 evaluates which workflow instance is to receive the call or event and loads the workflow instance with a correct state. In some cases, it is possible that multiple workflow instances may check if they are supposed to be a recipient of a call or event.

In other examples, a workflow can be a stateless workflow, which does not keep track of a current state of the workflow. Rather, the stateless workflow performs corresponding next steps or actions as events are received by the orchestrator 102. Use of a stateless workflow is generally suitable for asynchronous operation (discussed further below). A stateful workflow can be used with both a synchronous operation and asynchronous operation.

The events (e.g. results, responses, etc.) received by the orchestrator 102 can be provided by applications that are invoked in the workflow or from another source, such as through the API 105 of the message broker 104. The message broker 104 can also direct an event to a particular workflow instance (note that there can be multiple workflow instances executing concurrently). If the workflow instance is a stateful workflow, then an event can be provided to a state of the workflow.

The message broker 104 is operatively or communicatively coupled to the orchestrator 102 and the adapters 106. Generally, the message broker 104 is used to exchange messages among components, including the orchestrator 102 and the adapters 106. A message can include any or some combination of the following: a call (e.g. API call) or an event (e.g. response, result, or other type of event). The message broker 104 is responsible for ensuring that API calls and events (e.g. responses, results, etc.) are sent to the correct adapter or to the correct workflow instance (multiple workflow instances may execute concurrently). Alternatively, the endpoints (adapters and workflow instances) may all receive a call or event and make a decision regarding whether each endpoint should process the call or event.

The message broker 104 can also have an interface 105, which can include an API. An external entity can communicate with the message broker 104 using the API 105, such as to trigger a workflow (enterprise process or use case) or make progress (or step through) the workflow. The API 105 of the message broker can also be used to communicate a status update of a workflow.

The message broker 104 can include queues for temporarily storing information to be forwarded target components, and can include information forwarding logic that is able to determine a destination of a unit of information based on identifiers and/or addresses contained in the unit of information.

In some examples, the message broker 104 can employ an Advanced Message Queuing Protocol (AMQP), which is an open standard application layer protocol for message-oriented middleware. AMPQ is described in a specification provided by the Organization for the Advancement of Structured Information Standards (OASIS). An example of a message broker that employs AMPQ is RabbitMQ, which is an open source message broker application.

In other examples, other types of message brokers that employ other messaging or information exchange protocols can be used.

The information exchanged using the message broker 104 can include information sent by the orchestrator 102, where the information sent by the orchestrator 102 can include applications calls and/or data. An "application call" can refer to a command (or commands) or any other type of message that is issued to cause an instance of a respective application to execute to perform a requested task (or tasks).

The information exchanged using the message broker 104 can also include information sent by the applications. For example, the information sent by an application can include response information that is responsive to a respective application call. The information sent by the applications can also include information sent autonomously by an application without a corresponding request from the orchestrator 102. Information from an application can be included in an event sent by the application, where an "event" can refer to a representation of a unit of information. The event can include a response, a result, or any other information. Note that an event from an application can be in response to a synchronous call or asynchronous call. A synchronous call to an application by the orchestrator 102 is performed for a synchronous operation. In a synchronous operation, a workflow waits for a response to be received before proceeding further (in other words, the workflow blocks on the response). An asynchronous operation of a workflow refers to an operation in which the workflow does not wait for a response from an application in response to a call to the application.

In other examples, an event from an application can be due to something else occurring at the application level or in the environment (e.g. a support agent closes a ticket when using the application). Such an event can be sent to the workflow, such as the workflow for an incident case exchange use case (explained further below).

An event or call can also be received through the API 105 of the message broker 104 from another source.

The message broker 104 is able to respond to a call (such as an API call from the orchestrator 102 by making a corresponding call to the API of the respective instance of an application that is executing in a particular workflow instance. Adapters 106 may register with the message broker 104, and the message broker 104 can use the registration to determine how to direct a call, and how events (e.g. results, responses, etc.) are tagged or associated to a workflow instance. In some cases, it is possible that a message (a call or event) may be addressed to several workflow instances, in which case the message broker 104 can direct the message to the several workflow instances.

When performing a workflow based on flow logic executed by the orchestrator 102, the orchestrator 102 can issue application (synchronous or asynchronous) calls to the message broker 104 for invoking the applications at corresponding points in the workflow. A call can also be made by the orchestrator as part of throwing an event (which refers to the workflow deciding to communicate the event as a result of some specified thing occurring).

The flow logic for a respective workflow can be written abstractly using a canonical data model (CDM) 107. Although the canonical data model 107 is depicted as being inside the message broker 104, it is noted that the canonical data model 107 can be separate from the message broker 107 in other examples.

The canonical data model 107 can be used to express application calls to be issued by the orchestrator 102 to the message broker 104. The canonical data model 107 can also be used to express arguments (e.g. messages) for use in the calls, as well as the logic to be performed. The application calls can be abstract calls. The canonical data model 107 can be expressed in a specific language, such as a markup language or in another form.

More generally, a flow logic is written according to the canonical data model 107 can represent the following: arguments that are being exchanged in interactions of the applications, the functions that are called to support the interactions, the events (e.g. responses, results, or other events) that can result, any errors that can arise, and states of the use case executed across the applications. In general ad-hoc data models can be used but they may change whenever a new use case is introduced or when an application changes. According to implementations of the present disclosure, the canonical data model 107 can be been defined across a large number of use cases representative of the relevant interactions that can take place in a particular domain (such as IT management or another domain) and across a wide set of applications that can be used to support subsets of the use cases. Thus, in general, a canonical data model can be shared across use cases of a particular domain. A different canonical data model can be used for use cases of another domain. If a use case involves applications in different domains, then a canonical data model can be expanded to support the other domain, or multiple canonical data models may be used.

The information representing interactions between applications and the information representing the states of the applications can be used to track a current state of a workflow (assuming a stateful workflow). The information regarding the errors in the canonical data model 107 can be used for handling errors that arise during execution of the applications. The information regarding the errors can be used to map an error of an application to an error of the workflow that is being performed by the orchestrator 102.

By using the canonical data model 107, the development of flow logic that is valid across large sets of applications can be achieved. Sharing a data model across the flow logic can facilitate combining the flow logic and/or customizing the flow logic, and also allows for adapters to be changed or modified to replace applications.

In other implementations, the service exchange 100 does not employ the canonical data model 107, but rather development of the flow logic can be ad-hoc (such as by use of the ad-hoc models noted above) for each use case and/or set of applications.

The application calls issued by the orchestrator 102 can be sent through an interface between the orchestrator 102 and the message broker 104. In this way, the expression of the flow logic does not have to be concerned with specific data models or interfaces employed by the applications, which simplifies the design of the orchestrator 102.

Also, the orchestrator 102 does not have to know specific locations of the applications—the applications can be distributed across multiple different systems in disparate geographic locations. The message broker 104 is responsible for routing the application calls to the respective adapters 106.

Information communicated between the message broker 104 and the adapters 106 is also in an abstract form according to the canonical data model. For example, the message broker 104 can forward an abstract application call from the orchestrator 102 to a respective adapter. Similarly, an adapter can send an event from an application to the message broker in an abstract form according to the canonical data model.

The adapters 106 perform protocol translations between the protocol of the abstract API of the message broker 104, and the protocols to which the interfaces exposed by the corresponding applications are bound. As an example, the protocol of the abstract API of the message broker 104 can be according to a Representational State Transfer (REST) protocol or some other protocol. The protocol of an interface exposed by an application can include Simple Object Access Protocol (SOAP), Remote Procedure Call (RPC), Session Initiation Protocol (SIP), and so forth.

Each adapter 106 can also transform the data model of a message (e.g. message carrying an event) and an abstract API call to the data model and specific API call exposed by a particular application (e.g. instance or release of the particular application). Stated differently, the adapter 106 performs interface adaptation or interface translation by converting the abstract message or abstract API to a message or API call that conforms to the API of the target application. The reverse conversion is performed in the reverse direction, where the result, response, event, message or API call from an application is converted to an abstract message or abstract API call that can be passed through the message broker 104 to the orchestrator 102.

Each adapter 106 can also perform address translation between an address in the address space used by the orchestrator 102 and the message broker 104, and an address in the address space of an application.

As an example, the orchestrator 102 can issue an abstract application call (e.g. a call to a REST API) to application 1. This abstract application call is received by the adapter 106-1, which translates the abstract application call to one or multiple function calls according to the protocol used by application 1, to perform the task(s) requested by the abstract application call made by the orchestrator 102. The adapter 106-1 also adapts the APIs as noted above. A similar protocol translation and API translation are also performed in the other direction, for a call or event produced by an application. The adapter 106-1 can convert the message containing the call or event into an abstract message according to the protocol of the message broker 104, and pass the abstract message to the orchestrator 102.

In some cases, an adapter 106 can also emulate a specific behavior. For example, it is possible that an application is unable to generate an event. In this case, the respective adapter 106 can periodically poll the application with an API call to query if an something has occurred with the application, and the adapter 106 can generate (throw) an event on behalf of the application.

In some examples, when an application is replaced by another application with less functionality, the respective adapter 106 can also delegate or orchestrate with another application (or web service) that provides the missing functionality.

The service exchange 100 provides for a multi-point orchestrated integration across multiple applications.

As noted above, content of the service exchange platform including the orchestrator 102, the message broker 104, and the adapters 106 can be changed, such as from an administration system coupled to the service exchange 100. Applications can be changed, flow logic can be changed, and use cases can be created.

Any given application can be updated or replaced, simply by replacing or modifying the corresponding adapter. For example, if an enterprise wishes to upgrade or replace application 1 in FIG. 1 (with a new application or an updated version of application 1), then the corresponding adapter 106-1 to which application 1 is coupled can be replaced or updated to support the updated or replaced application. In some cases, replacing the application can involve replacing a first application supplied by a first vendor with a second application supplied by a different vendor. In other cases, replacing the application can involving replacing a first application supplied by a vendor with another application supplied by the same vendor. As yet another example, replacing the application can include upgrading the application to a new release.

Changing a given adapter can involve removing a representation of the adapter (which can be in the form of program code, a markup language file, or some other representation), and replacing the removed representation of the adapter with a new representation of a different adapter. Changing the given adapter can alternatively involve modifying the given adapter or modifying a configuration of the given adapter to support the different application. The changing of the given adapter can be performed by a machine or by program code, either autonomously (such as in response to detection of a replacement of an application) or in response to user input.

Changing an application may also involve moving an instance of the application from one instance to another instance, or from one location to another location. The respective adapter can be updated or configuration of the adapter is changed (the adapter itself remains unchanged), to refer to another application instance or to an instance of the application at another location.

When changing an application to a new or updated application, it may be possible that certain functionality of the previous application is no longer available from the new or updated application. In this case, the respective adapter can delegate or orchestrate with another application (or web service) that provides the missing functionality. Alternatively, the workflow can be modified to take into account the loss of functionality in the use case.

Also if new functionality is provided by new or upgraded application, the workflow can be modified to use the new functionality.

In accordance with some implementations, a workflow can be modified relatively easily by changing the respective flow logic with a different flow logic (a modified version of the flow logic or a new flow logic). The different flow logic can then be loaded onto the orchestrator 102 to implement the modified workflow. By using the service exchange 100, workflows can be easily customizable by providing new or modified flow logic to the orchestrator 102. Nothing else has to be changed unless a new use case specifies use of new calls and data not covered in current adapters (e.g. an adapter is able to call just a subset of APIs of the application) or the canonical model. In this latter case, the canonical data model can be updated and adapters can be updated to be able to make the calls, or new adapters can be provided.

New use cases can also be created, and corresponding flow logic and adapters can be provided. In addition, the canonical data model may be updated accordingly.

The content changes noted above can be performed using any of various tools, such as a Software Development Kit (SDk) tool or other type of tool used to create applications and other program code. A content pack can be updated using the tool, and the modified content pack can be loaded using an administration system. The administration system can configure the adapters to point to the correct instance of an application. A new use case and respective content can be also created with a SDk tool. Note also that when the canonical data model 107 is updated, the canonical data model 107 remains backwards compatible with content packs of existing use cases.

Figure 2:
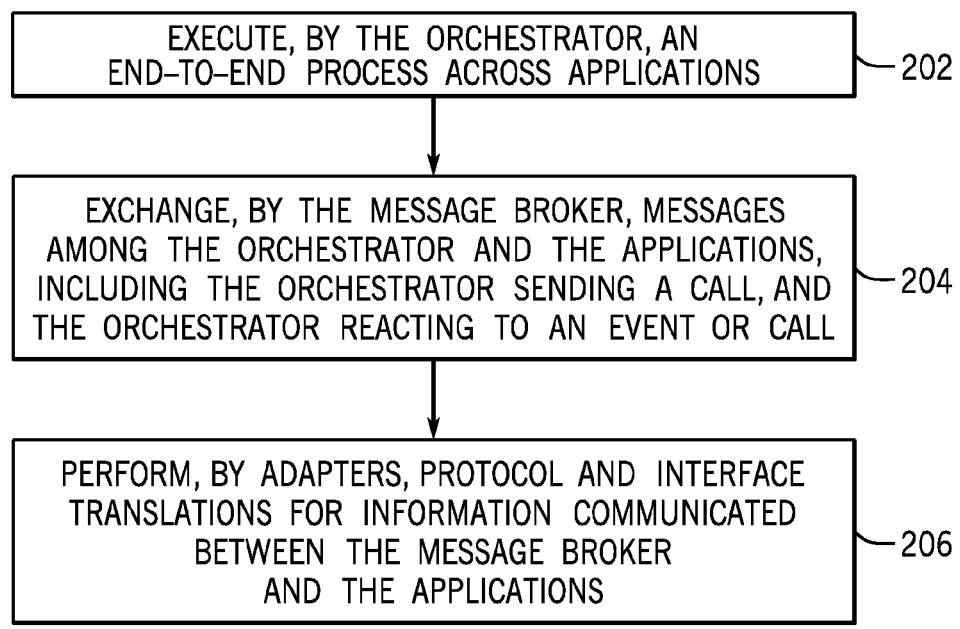
FIG. 2 is a flow diagram of an example orchestrated execution of an end-to-end process according to some implementations.

FIG. 2 illustrates tasks that can be performed by the service exchange 100, in accordance with some implementations. The orchestrator 102 executes (at 202) an end-to-end process across applications. Executing an end-to-end process across applications includes delegating tasks of the end-to-end process to the applications. The message broker 104 exchanges (at 204) messages among the orchestrator 102 and the applications. Exchanging the messages includes the orchestrator 102 issuing application calls to the message broker 104 that are delivered to respective applications (or more specifically, to the respective adapters 106). The applications can react to the application calls with events, which are sent by the applications through the adapters 106. The events are then sent by the message broker 104 to the orchestrator 102. The orchestrator 102 reacts to the events or calls from the applications, or to an event or call from another source through an interface (e.g. 105) of the message broker 104. Note also that the applications or another source can additionally or alternatively issue calls to the orchestrator 102—the orchestrator 102 can also react to such calls by performing respective actions.

The orchestrator 102 responds to an event or call by transitioning to a next state (assuming a stateful workflow) and invoking a next action to be performed for the end-to-end process. This can involve a further application call by the orchestrator 102 to respective applications through the message broker 104. For a stateless workflow, an identification is made of which flow logic applies to execute next steps.

The adapters 106 perform (at 206) protocol and interface translations for information communicated between the message broker 104 and the respective applications.

Figure 3:
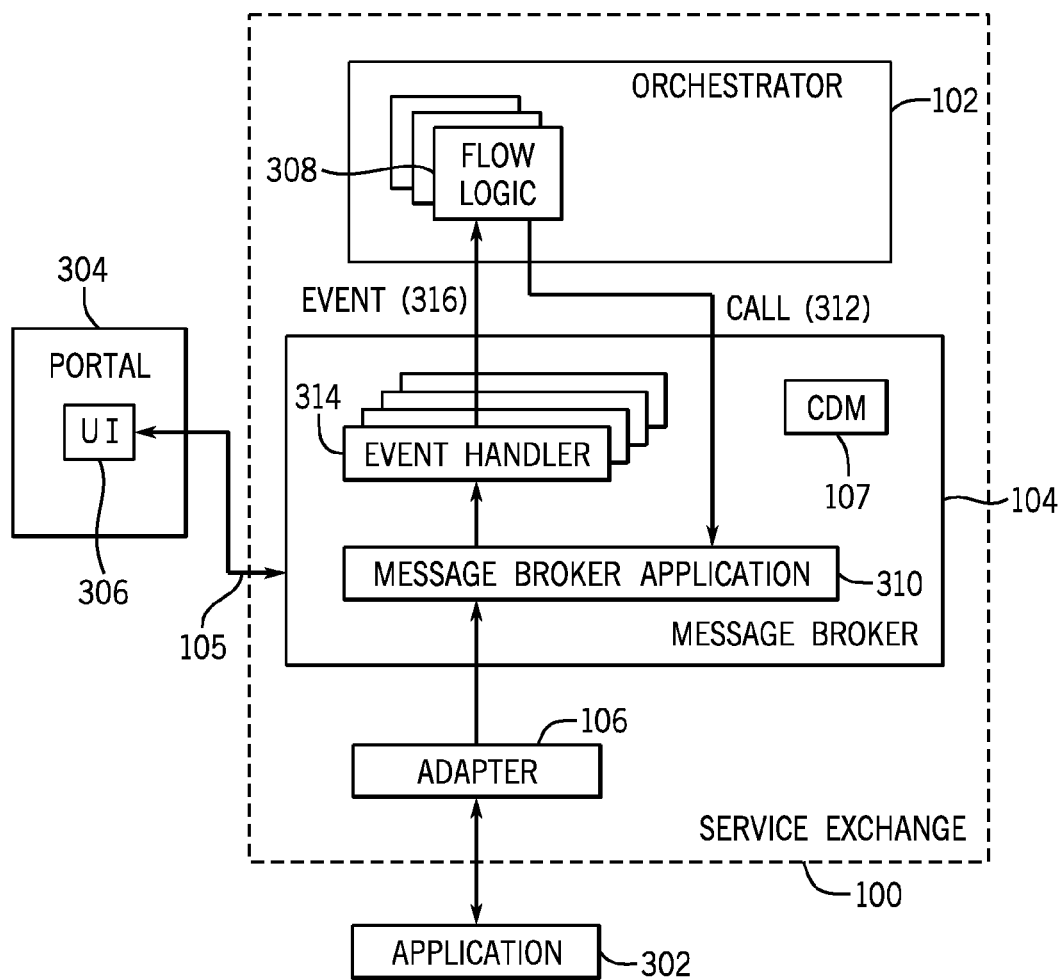
FIG. 3 is a block diagram of an example arrangement including a portal, a service exchange, and an application, in accordance with further implementations.

FIG. 3 is a block diagram of an example arrangement according to alternative implementations or views of the present disclosure. The arrangement of FIG. 3 includes the service exchange 100, an application 302, and a portal 304. The portal 304 is an example of an entity interacting with the API 105 for triggering workflows. Although FIG. 3 shows the portal 304 as using the message broker 104, it is noted that the portal 304 can also be one of the applications orchestrated through a respective adapter 106. Although just one adapter 106 and one application 302 is shown in FIG. 3, it is noted that multiple adapters 106 and multiple applications 302 can be present. The message broker 104 in FIG. 3 includes event handlers 314, which as explained below are used to implement a stateless workflow.

In some examples, the portal 304 includes a user interface (UI) 306. The portal 304 can include machine-executable instructions or a combination of machine-executable instructions and processing hardware. The portal 304 can be at a computer (e.g. client computer) that can be remote from the service exchange 100. The UI 306 allows a user to interact with the service exchange 100.

A user can perform an action in the UI 306 that triggers the execution of a flow logic 308 (of multiple different flow logic) by the orchestrator 102 to perform a workflow. For example, the workflow can be an order fulfillment workflow, as discussed further above. The order fulfillment workflow can be triggered in response to the user ordering an item or service through the UI 306. The order fulfillment workflow performed by execution of the flow logic 308 includes tasks to fulfill the ordered item or service. For example, in response to the order, the order fulfillment workflow can be performed, in which the orchestrator 102 requests fulfillment of the order by orchestrating applications. In some cases, the orchestrator 102 can ask the applications which of them can fulfill the order. The orchestrator 102 waits for confirmation from each of the applications, after which a status indication or other information can be sent back to the UI 306 by the flow logic 308 to indicate a status (success status or error status) of the order.

An indication of user action in the UI 306 (e.g. an action to order an item or service) can be communicated to the orchestrator 102 and the corresponding workflow by the portal 304 and the message broker 104. The indication can be communicated using the API 105 (e.g. REST API) of the message broker 104.

This indication of user action received by the message broker 104 can be communicated by a message broker application 310 to the orchestrator 102, which invokes execution of the corresponding flow logic 308 to perform the requested workflow. An example of the message broker application 310 is the RabbitMQ application. However, in other examples, other types of message broker applications or other applications for exchanging information between components can be employed.

In performing the workflow, the flow logic 308 as executed by the orchestrator 102 can issue an application call 312 to the application 302. The application call 312 is sent by the orchestrator 102 to the message broker application 310, which forwards the application call 312 to the respective adapter 106 for the application 302. The adapter 106 translates the application call to specific one or multiple function calls of the application 302.

In response to the application call, the application 302 produces a responsive event that is sent to the adapter 106, which translates the event to an abstract format. The translated event is passed by the adapter 106 to the message broker application 310. The message broker application 310 in turn passes the event to a selected event handler 314 of multiple event handlers. The selected event handler 314 sends the event (316) to the flow logic 308 executed by the orchestrator 102. The event handler 314 can receive an event, temporarily store the event, and propagate the event to the orchestrator 102. Different event handlers can handle different events.

Use of the event handlers 314 allows the events to be asynchronous events associated with a stateless workflow (for an asynchronous operation). In response to each event, a respective event handler 314 can launch the corresponding stateless flow. Note that a collection of the stateless flows make up a workflow.

In examples where the workflow is a stateful workflow, the events are part of an exchange of information in a synchronous operation. In such a case, the event handlers 314 can be dispatchers of events (or calls) to a respectful stateful workflow instance. For a stateful workflow, in response to the event (316), the flow logic 308 can transition from a current state of the workflow to a next state of the workflow, and the flow logic 308 can trigger a next action in response to the event (316).

Workflows that can be executed by the orchestrator 102 can correspond to various use cases that are to be implemented by the service exchange 100. To implement a use case, a corresponding flow logic and respective adapters can be added to the service exchange 100.

The order fulfillment workflow discussed above is an example of an order fulfillment use case.

Another example use case can be an IT management use case, for managing an IT infrastructure (including computers, storage devices, communication nodes, machine-executable instructions, etc.). The workflow for an IT management use case can include actions for addressing self-service or support entered tickets that denote faults or errors in the IT infrastructure, for upgrading or repairing components of the IT infrastructure, for setting up user accounts, for managing the security of the IT infrastructure, and so forth. The workflow for the IT management use case can be performed by another flow logic that can be executed by the service exchange 100. A user-enter ticket can be passed to a support system where the ticket is processed and a ticket number is returned to a user. The support system can then process, update and close the ticket. The user is notified of updates, and the user can also view, update or close the ticket if received by the user.

Another example use case is incident case exchange. An incident case can refer to a representation of any incident that can occur in a system, such as an IT infrastructure or any other type of system. A simplified workflow for an incident case exchange can include the following. A user for self-service IT or a support customer support representative creates a ticket about an issue. The event corresponding to the ticket can be passed to a workflow, which creates ticket and sends to a support desk application. Next, notification of a ticket reference is provided to the user. Automatically or as the result of triage by support desk support personnel, the ticket is sent or shared with other support desk personnel, who may be responsible for all or part of the support issues (e.g. other levels of support or domains of expertise or responsibility). The ticket may also be sent to all support desk personnel available, including those of a third party. The support personnel can then process the ticket, update the ticket, and eventually close all or parts of the ticket. Updates are fed back to the user who can also answer questions, add details, or close the ticket. The foregoing steps are performed by having an incident case exchange workflow sharing and orchestrating next steps with the applications.

An example customization of the incident case exchange workflow can involve changing the first step to send the ticket to all or some subset of applications instead of to just one application. This customization can be performed by just changing the corresponding flow logic.

In other examples, other use cases (e.g. system security, data management, etc.) can be supported using the service exchange 100.

Some use cases can be use cases according to a vendor-neutral Reference Architecture provided by the IT4IT™ Forum. The reference architecture that provides guidance relating to integrating technology products and services that are used for IT management. In other examples, the use cases can be according to other types of reference architectures for IT management.

Use cases according to the IT4IT™ Reference Architecture and artifacts associated with such use cases can be implemented using the service exchange according to the present disclosure. A canonical data model can be developed for such use cases/domains, where such canonical data model can include arguments, functions, events, errors, etc. for the use cases.

The workflow for an end-to-end process of a use case according to the IT4IT™ Reference Architecture can be orchestrated using the orchestrator of the service exchange according to some implementations of the present disclosure. Also, adapters can perform protocol and interface translations for information between the orchestrator/message broker of the service exchange and the applications.

Examples of use cases include a strategy to portfolio (S2P) use case (to achieve alignment between IT deliverables and business goals using a framework that allows an organization to manage and optimize a portfolio of services for the enterprise), a requirement to deployment (R2D) use case (for creating or sourcing a new service or modifying an existing service), a request to fulfill (R2F) use case (to fulfill an order for an offering of the enterprise), a detect to correct (D2C) use case (to provide a framework to integrate monitoring, event detection, diagnosis, change, and remediation tasks), and so forth. A use case can also include an end-to-end combination of any subset of the foregoing use cases or other use cases, such as incident case exchange (discussed above), multi-supplier case exchange, dosed loop incident process (CLIP), service asset configuration management (SACM), and so forth.

By deploying a use case using the service exchange according to the present disclosure, it is possible to transition from a traditional IT management approach to any new style of IT management by a service provider, cloud enterprise, or any other enterprise. Such transition can be achieved for example by customizing (modifying) the use cases (e.g. modifying the workflows) and using or adding new applications.

Figure 4:
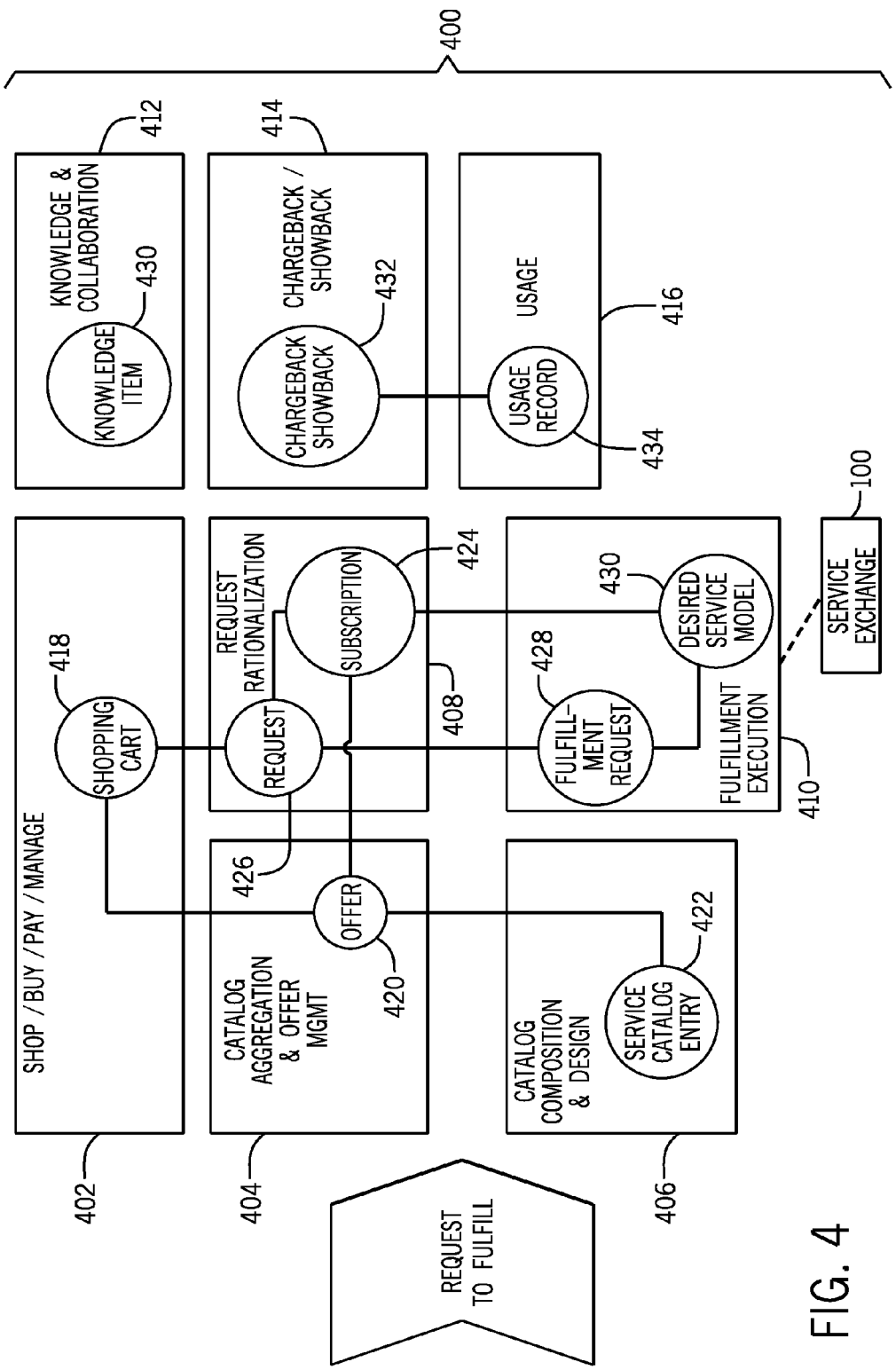
FIG. 4 is a schematic diagram of a model of a use case according to an information technology (IT) reference architecture, according to further implementations.

FIG. 4 shows a model (also referred to as a value stream) 400 of the R2F use case according to the IT4IT™ Reference Architecture that can be deployed on the service exchange 100 discussed above. R2F provides a consumption-oriented engagement model that goes beyond traditional IT management. RDF focuses on the service engagement experience which includes both consumption and fulfillment, as well as knowledge sharing and collaboration between communities of interest to improve the overall service experience and facilitates self-service support.

The various blocks 402, 404, 406, 408, 410, 412, 414, and 416 of FIG. 4 represent various functions that are associated with the R2F use case. Various circles within the blocks represent artifacts that are employed in the R2F use case. The block 402 represents a function to allow a customer to order an offering, where the order can be included in a shopping cart artifact 418. The offering can be presented by an offer artifact in the catalog aggregation and offer management block 404. An offer is a description of a service catalog entry, represented by a service catalog entry artifact 422 in the catalog composition and design block 406. The offer can include terms and conditions, price, configurable options, approval, service-level agreement (SLA), and so forth. A catalog describes a service (or services).

A subscription artifact 424 is included in a request rationalization block 408. A subscription can include a registration record of service consumption. In some examples, an offering ordered from a catalog is associated with a subscription. FIG. 4 shows a relationship between the offer and subscription. Note that a single offer can have many subscriptions.

An order placed in the shopping cart (418) causes a request to be generated; the request is represented by a request artifact 426 in the request rationalization block 408. Fulfillment execution is performed in response to the request, as represented by the fulfillment request block 428 in the fulfillment execution block 410. Based on this fulfillment request, a desired service model (represented by artifact 430 in the fulfillment execution block 410) can be derived for the request. Based on the desired service model, an orchestration of deployment of the requested service can be performed using the service exchange 100.

A knowledge item artifact 430 in the knowledge and collaboration block 412 can represent the knowledge base associated with the RDF use case.

A chargeback contract artifact 432 in the chargeback/showback block 414 represents a chargeback record that describes a payment for service used.

A usage record artifact 434 in the usage block 416 represents usage, as captured during performance of a service. Usage records can be summarized in the chargeback record associated with a subscription.

Figure 5:
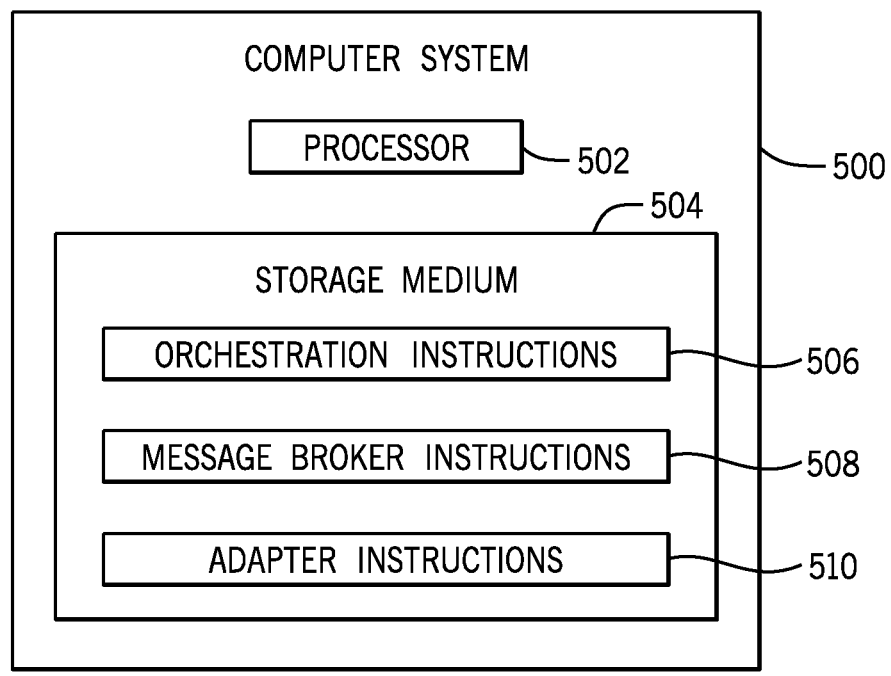
FIG. 5 is a block diagram of an example computer system according to some implementations.

FIG. 5 is a block diagram of an example computer system 500 according to some implementations, which can be used to implement the service exchange 100 according to some implementations. The computer system 500 can include one computer or multiple computers coupled over a network. The computer system 500 includes a processor (or multiple processors) 502. A processor can include a microprocessor, a microcontroller, a physical processor module or subsystem, a programmable integrated circuit, a programmable gate array, or another physical control or computing device.

The processor(s) 502 can be coupled to a non-transitory machine-readable or computer-readable storage medium 504, which can store various machine-executable instructions. The machine-executable instructions can include orchestration instructions 506 to implement the orchestrator 102, message broker instructions 508 to implement the message broker 104 (including the message broker application 310 and event handlers 314 shown in FIG. 3), and adapter instructions 510 to implement the adapters 106.

The storage medium (or storage media) 504 can include one or multiple forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A method comprising:
   executing, by an orchestrator, an end-to-end process across applications;
   exchanging, by a message broker, messages among the orchestrator and the applications, wherein exchanging the messages comprises the orchestrator sending a call to at least one of the applications, and the orchestrator reacting to an event or call from the at least one application or another source through an interface of the message broker; and
   performing, by adapters, protocol and interface translations for information communicated between the message broker and the respective applications.

2. The method of claim 1, wherein performing the protocol and interface translations comprises translating between a protocol of an interface of the message broker and a protocol of an interface of a respective application, translating between a call communicated with the message broker and a call for the interface of the respective application, and translating between an event communicated with the message broker and an event for the interface of the respective application.

3. The method of claim 1, further comprising emulating, by an adapter of the adapters, a given event for an application that is unable to generate the given event.

4. The method of claim 1, further comprising expressing a flow logic for the end-to-end process using a canonical data model.

5. The method of claim 4, further comprising using the canonical data model to express arguments that are exchanged in interactions of the applications, functions called to support the interactions, events that can result from the interactions, and errors that can arise.

6. The method of claim 1, further comprising:
   replacing a first of the applications with a different application by changing a corresponding adapter of the adapters.

7. The method of claim 6, wherein replacing the first application with the different application results in a functionality of the first application no longer being available from the different application, the method further comprising:
   delegating, by an adapter for the first application, performance of the functionality to another application or service.

8. The method of claim 1, further comprising loading flow logic into the orchestrator to cause the orchestrator to execute the flow logic to perform the end-to-end process.

9. The method of claim 8, further comprising loading a modified and customized flow logic into the orchestrator to modify the end-to-end process.

10. The method of claim 8, further comprising using a tool to perform at least one from among modifying the flow logic, changing an adapter, modifying a canonical data model, modifying a content pack for a use case, creating a new flow logic, creating a canonical data model, and creating a content pack for a use case.

11. The method of claim 8, wherein a flow of the flow logic includes a stateful flow or a stateless flow.

12. The method of claim 1, wherein end-to-end process includes a synchronous operation or an asynchronous operation.

13. The method of claim 1, further comprising:
   receiving, from a portal by the message broker through an application programming interface, invocation of the end-to-end process to be orchestrated by the orchestrator, wherein the portal is one of the applications.

14. The method of claim 1, wherein exchanging the information by the message broker comprises:
- communicating, by the message broker, calls from the orchestrator for invoking selected applications of the applications, to respective adapters;
- communicating, by the message broker, calls or events from the applications to the orchestrator; and
- communicating, by the message broker, calls or events from another source through an interface of the message broker, to the orchestrator.

15. The method of claim 1, further comprising:
- creating a use case to be implemented by a service exchange that includes the orchestrator, the message broker, and the adapters, wherein creating the use case comprises using a tool to create or update a content pack that is loaded to the service exchange, wherein different content packs for respective use cases coexist.

16. The method of claim 15, further comprising updating a canonical data model that expresses arguments that are exchanged in interactions of the applications, functions called to support the interactions, events that can result from the interactions, and errors that can arise,
- wherein the updated canonical model remains compatible with existing use cases.

17. A system comprising:
- a service exchange to provide an orchestrated execution of an end-to-end process across applications, the service exchange comprising:
  - an orchestrator to execute the end-to-end process defined by flow logic;
  - a message broker; and
  - adapters to provide protocol and interface translations for information communicated between the message broker and the applications,
  - the orchestrator to issue calls of the applications to the message broker that are sent by the message broker to the respective adapters, and
  - the message broker to receive calls or events from the applications through the adapters, and to send the received calls or events to the orchestrator,
  - wherein at least one of the adapters is replaceable with a different adapter to allow a respective first of the applications to be replaced with a different application.

18. The system of claim 17, further comprising a portal including a user interface, the portal to send an indication of a user action in the user interface to trigger execution of the end-to-end process by the orchestrator.

19. The system of claim 17, further comprising a canonical data model, wherein the flow logic is expressed according to the canonical data model, and the canonical data model expresses arguments that are exchanged in interactions of the applications, functions called to support the interactions, events that can result from the interactions, and errors that can arise.

20. The system of claim 17, further comprising a tool to load content into the service exchange, wherein the content includes the flow logic, content packs for use cases, and the applications.

21. The system of claim 17, wherein multiple instances of end-to-end processes are executable in parallel by the service exchange.

22. An article comprising at least one non-transitory machine-readable storage medium storing instructions to integrate applications, the instructions upon execution causing a system to:
- execute, by an orchestrator, a triggered flow logic of a plurality of flow logic, the triggered flow logic performing a workflow that includes tasks of applications;
- exchange, by a message broker, information among the orchestrator and the applications, wherein exchanging the messages comprises the orchestrator sending a call to at least one of the applications, and the orchestrator reacting to an event from the at least one application or another source through an interface of the message broker;
- perform, by adapters, protocol and interface translations for information communicated between the message broker and the respective applications.

23. A method comprising:
- performing an end-to-end process of a use case of an information technology (IT) reference architecture using a service exchange that comprises an orchestrator, a message broker, and adapters, wherein performing the end-to-end process using the service exchange comprises:
  - executing flow logic on the orchestrator to perform the end-to-end process;
  - exchanging, by the message broker, messages among the orchestrator and applications, wherein exchanging the messages comprises the orchestrator sending a call to at least one of the applications, and the orchestrator reacting to an event from the at least one application or another source through an interface of the message broker, and
  - performing, by the adapters, protocol and interface translations for information communicated between the message broker and the respective applications.

24. The method of claim 23, further comprising modifying the use case to change an IT management approach.

* * * * *